(12) United States Patent
Yoon et al.

(10) Patent No.: US 9,672,624 B2
(45) Date of Patent: Jun. 6, 2017

(54) METHOD FOR CALIBRATING ABSOLUTE MISALIGNMENT BETWEEN LINEAR ARRAY IMAGE SENSOR AND ATTITUDE CONTROL SENSOR

(71) Applicant: KOREA AEROSPACE RESEARCH INSTITUTE, Daejeon (KR)

(72) Inventors: Hyung Joo Yoon, Daejeon (KR); Hong-Taek Choi, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 161 days.

(21) Appl. No.: 14/646,297

(22) PCT Filed: Nov. 15, 2013

(86) PCT No.: PCT/KR2013/010413
§ 371 (c)(1),
(2) Date: May 20, 2015

(87) PCT Pub. No.: WO2014/104574
PCT Pub. Date: Jul. 3, 2004

(65) Prior Publication Data
US 2015/0348264 A1 Dec. 3, 2015

(30) Foreign Application Priority Data
Dec. 28, 2012 (KR) .................. 10-2012-0157652

(51) Int. Cl.
G06T 7/246 (2017.01)
B64G 1/24 (2006.01)
(Continued)

(52) U.S. Cl.
CPC ............ *G06T 7/0018* (2013.01); *B64G 1/361* (2013.01); *G05D 1/0883* (2013.01);
(Continued)

(58) Field of Classification Search
CPC combination set(s) only.
See application file for complete search history.

(56) References Cited

U.S. PATENT DOCUMENTS 5,899,945 A * 5/1999 Baylocq ................. G01C 11/02
348/143
6,222,174 B1 * 4/2001 Tullis ..................... G06K 9/228
250/208.1

(Continued)

OTHER PUBLICATIONS

"An efficient algorithm for Spacecraft Attitude Determination with Optical Sensors", Malcolm D. Shuster, Paper AAS-98-333, Proceedings, AAS/ GSFC International Symposium on Space Flight Dynamics, NASA Goddard Space Flight Center, Greenbelt, Maryland, May 11-15, 1998; Advances in the Astronautical Sciences, vol. 100, 1998, pp. 407-419.*

(Continued)

*Primary Examiner* — Sath V Perungavoor
*Assistant Examiner* — Janese Duley
(74) *Attorney, Agent, or Firm* — McCoy Russell LLP

(57) ABSTRACT

Provided is a method for estimating and calibrating an absolute misalignment between an attitude control sensor of a satellite or a flight vehicle imaging and transmitting ground images having high resolution and an imaging payload.

3 Claims, 5 Drawing Sheets

(51) Int. Cl.
   *G06T 7/00*      (2017.01)
   *G06T 7/20*      (2017.01)
   *G06T 5/00*      (2006.01)
   *G06T 3/40*      (2006.01)
   *H04N 5/232*     (2006.01)
   *B64G 1/36*      (2006.01)
   *G05D 1/08*      (2006.01)
   *H04N 1/00*      (2006.01)
   *H04N 5/369*     (2011.01)
   *H04N 17/00*     (2006.01)
   *G06T 7/80*      (2017.01)

(52) U.S. Cl.
   CPC .......... *G06T 3/4053* (2013.01); *G06T 3/4076* (2013.01); *G06T 5/006* (2013.01); *G06T 7/20* (2013.01); *G06T 7/80* (2017.01); *H04N 1/00* (2013.01); *H04N 5/23232* (2013.01); *H04N 5/3692* (2013.01); *H04N 17/002* (2013.01); *G06T 2200/21* (2013.01); *G06T 2207/10032* (2013.01); *G06T 2207/20221* (2013.01); *G06T 2207/30181* (2013.01); *G06T 2210/56* (2013.01)

(56) References Cited

U.S. PATENT DOCUMENTS

| | | |
|---|---|---|
| 6,298,288 B1 | 10/2001 | Li et al. |
| 6,336,062 B1 | 1/2002 | Yamashita |
| 2005/0108884 A1* | 5/2005 | Wang .................. G01C 25/005 33/328 |
| 2006/0149474 A1 | 7/2006 | Needelman et al. |
| 2013/0193303 A1* | 8/2013 | Smith .................. G01C 21/24 250/203.6 |

OTHER PUBLICATIONS

Yong, K. et al., "On-Orbit AOCS Sensor Calibration of Spacecraft," Aerospace Engineering and Technology, vol. 5, No. 2, Nov. 2006, 12 pages.

ISA Korean Patent Office, International Search Report Issued in Patent Application No. PCT/KR2013/010413, Feb. 19, 2014, WIPO, 4 pages.

* cited by examiner

METHOD FOR CALIBRATING ABSOLUTE MISALIGNMENT BETWEEN LINEAR ARRAY IMAGE SENSOR AND ATTITUDE CONTROL SENSOR

CROSS REFERENCE TO RELATED APPLICATIONS

The present application is a U.S. National Phase of International Patent Application Serial No. PCT/KR2013/010413, entitled "METHOD FOR CALIBRATING ABSOLUTE MISALIGNMENT BETWEEN LINEAR ARRAY IMAGE SENSOR AND ATTITUDE CONTROL SENSOR," filed on Nov. 15, 2013, which claims priority to Korean Patent Application No. 10-2012-0157652, entitled "METHOD FOR CALIBRATING ABSOLUTE MISALIGNMENT BETWEEN LINEAR ARRAY IMAGE SENSOR AND ATTITUDE CONTROL SENSOR," filed on Dec. 28, 2012, the entire contents of each of which are hereby incorporated by reference for all purposes.

TECHNICAL FIELD

The present invention relates to a method for estimating and calibrating an absolute misalignment between an image payload that images a ground image at high resolution using a one-dimensional linear array image sensor for a satellite or an airplane and an attitude control sensor.

BACKGROUND ART

An imaging satellite is operated in order to investigate an atmospheric change, a weather forecast, a resource distribution, and the like, and the imaging satellite images a ground image at high resolution and transmits the imaged ground image to a base station while revolving on a low earth orbit. In this case, when an attitude of the satellite is not properly controlled, it is difficult to obtain an image of an intended point. Therefore, an attitude control system is mounted in the satellite to accurately perform an attitude control.

A performance index of the attitude control system of the satellite is indicated by directional awareness, directional precision, and the like. Examples of factors affecting the directional awareness, the directional precision, and the like include attitude control error, attitude determination error, orbit propagation error, alignment error of a payload such as an electro-optical camera attached to a body coordinate system, and the like, and therefore, improvement of the direction awareness and the directional precision is achieved by minimizing effects of the error factors.

The attitude determination error of the above-mentioned several error factors depends on characteristics, timing bias, mounting error, or the like of attitude control sensors such as a gyro sensor, a star tracking sensor, and the like, and in order to improve performance of the attitude control, an accurate calibration for the mounting error or characteristics of the above-mentioned sensors should be performed.

Examples of the attitude control sensor include a magnetic field sensor, a solar sensor, and the like, including the star tracking sensor and the gyro sensor, and the star tracking sensor and the gyro sensor among the above-mentioned sensors are sensors requiring high precision which are used for a precise attitude control, wherein the star tracking sensor performs a function of observing a position of a star with a plane image sensor to calculate an attitude of the sensor, and the gyro sensor performs a function of measuring angular velocity of a gyro, and the attitude and angular velocity measurement values calculated by the above-mentioned sensors are converted into attitude and angular velocity of the satellite by again considering a mounting attitude of each sensor for a satellite body to use for determining the attitude of the satellite.

Particularly, since directional information of image payload is important in a case of image satellite having high resolution, when the mounting attitude of the attitude control sensor is defined for a reference coordinate system of a satellite payload, not the body of the satellite, the attitude determination and the attitude control of the satellite are automatically performed for an attitude of the payload.

The most accurate measurement of the mounting attitude of the above-mentioned sensors is typically performed to be reflected to mounting software before launching the satellite, but error, that is, misalignment of the sensor from original mounting attitude information occurs due to impact during a process of launching the satellite, an environment change on the orbit, or the like as well as error upon the measurement. Therefore, in order to improve the directional awareness and precision of the satellite, the misalignment of the sensor should be necessarily again estimated and calibrated while a satellite is in orbit, after the launching of the satellite is completed.

The misalignment of the attitude control sensor is classified into relative misalignment and absolute misalignment, wherein the relative misalignment means relative misalignment between the sensors, and in order to match the attitude information measured by the respective sensors to each other, the attitude information should be calibrated, and the absolute misalignment means misalignment of the sensor for an image payload, and a calibration is required to accurately image a ground control point intended to be imaged or extract accurate position information using the imaged image.

A plurality of articles and studies for a technique for calibrating the relative misalignment and the absolute misalignment described above have been published, and the majority of studies for a method for calibrating the absolute misalignment among these mainly use a scheme in which the image payload is regarded as a kind of attitude control sensor such as the star tracking sensor to estimate an alignment attitude between the image payload and the attitude control sensor or a reference body.

However, as in a case of an imaging satellite having high resolution, in a case in which the image payload uses a scheme in which a linear array sensor is scanned and imaged, since an operation scheme is very different from the star tracking sensor using a two-dimensional plane sensor, it is difficult to directly apply the method for calculating the absolute misalignment as described above.

DISCLOSURE

Technical Problem

An object of the present invention is to provide a method for calibrating an absolute misalignment of an attitude control sensor capable of simply and accurately estimating and calibrating the absolute misalignment between the attitude control sensor and an image payload using attitude information measured by attitude control sensors, image information imaged by the image payload, and position information of a satellite.

Technical Solution

In one general aspect, a method for calibrating an absolute misalignment of an attitude control sensor includes: a ground control point imaging and comparing operation in which a plurality of ground control points of which accurate position information is known are each imaged using an image payload using a linear array sensor and position information of the ground control points in a plurality of imaged images and position information of the ground control points which are already known are then compared with each other; an absolute misalignment estimation value calculating operation of estimating an absolute misalignment value between an attitude control sensor and the image payload by applying a method for estimating an attitude of a plane image sensor using an image obtained by the plane image sensor to information obtained by performing the ground control point imaging and comparing operation; and a calibrating operation of calibrating the absolute misalignment by applying the calculated absolute misalignment estimation value to attitude control sensors.

A method for calculating an attitude of the plane image sensor using an image of a star obtained by the plane image sensor may be any one of a DAVENPORT algorithm and a QUEST algorithm among methods for minimizing an objective function defined as the following Equation 2.

$$J(A) = \frac{1}{2}\sum_{i=1}^{N} |\hat{W}_i - A\hat{V}_i|^2 \quad \text{[Equation 2]}$$

wherein J(A) is an objective function, A is a coordinate transformation matrix of the plane image sensor, N is the number of targets in the imaged image, and $\hat{W}_i$ is a position vector of the imaged image, $\hat{V}_i$ and is a direction vector in an inertia coordinate system of the target.

The information obtained by the ground control point imaging and comparing operation may be transformed to have a form of the following Equation 6 by dividing and re-disposing the information into a time-varying term and a time-invariant term.

$$M_{Body}^{PL} \hat{V}_i = \hat{W}_i \quad \text{[Equation 6]}$$

$$\hat{V}_i = M_{ECI}^{Body} M_{ECEF}^{ECI} \begin{bmatrix} X_i - X_i^S \\ Y_i - Y_i^S \\ Z_i - Z_i^S \end{bmatrix}_{ECEF}$$

wherein $$\hat{W}_i \begin{bmatrix} 0 \\ y_i \\ f \end{bmatrix}_{Image}$$

and it is assumed that all vectors are normalized.

The absolute misalignment estimation value $M_{Body}^{PL}$ may be calculated by Equation 6 and new attitudes of the attitude control sensors may be calculated by the following Equation 10.

$$M_{Body}^{S}(\text{new}) = M_{Body}^{S}(\text{old})(M_{Body}^{PL})^I \quad \text{[Equation 10]}$$

wherein a superscript S shows the attitude control sensor.

Advantageous Effects

According to the present invention, the absolute misalignment between the attitude control sensor and the image payload may be simply and accurately estimated and calibrated by applying a technique of calculating an attitude of the sensor using the plane image information by a conventional plane image sensor to the attitude information measured by the attitude control sensor and the image information imaged by the image payload using the one-dimensional linear array image sensor.

BEST MODE

Before describing a configuration of the present invention, an attitude determining method for determining an attitude of a two-dimensional plane image sensor upon imaging using images of stars imaged by the two-dimensional plane image sensor will be first described.

Figure 1:
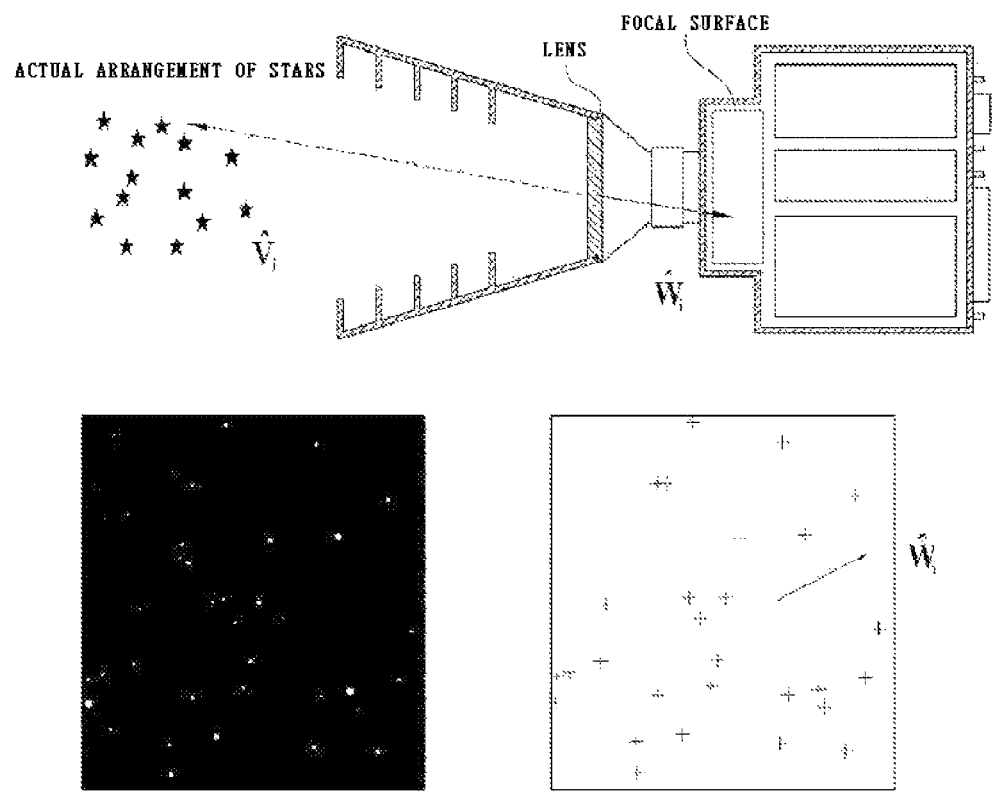
FIG. 1 is a diagram illustrating a star tracking sensor in which a plane image sensor is mounted and an example of an image of an imaged star.

FIG. 1 is a diagram illustrating a star tracking sensor in which a plane image sensor is mounted, and an image imaged by the plane image sensor, wherein the star tracking sensor is operated in a scheme in which a plurality of targets (stars) are imaged using the plane image sensor and an attitude for an inertial coordinate system of the plane image sensor of an imaging moment is then calculated using a direction vector $\hat{V}_i$ in the inertia coordinate system of the targets and a position vector $\hat{W}_i$ in the imaged image.

That is, the plane image sensor finds a coordinate transformation matrix A satisfying the following Equation 1 for i=1, . . . , N(N≥2), which is referred to as an attitude determination.

$$\hat{W}_i = A\hat{V}_i \quad \text{[Equation 1]}$$

Here,
$\hat{W}_i$ is a position vector in the imaged image,
$\hat{V}_i$ is a direction vector in the inertia coordinate system of the target, and
A is a coordinate transformation matrix.

In this case, if the number of targets necessary to determine the attitude of the plane image sensor is theoretically two or more, the attitude of the plane image sensor may be determined, but the attitude of the plane image sensor is generally calculated using eight to ten targets in order to increase accuracy.

As a method for calculating the attitude determination of the plane image sensor, there are several methods. Among these, a method for finding an optimal solution is most widely used. The above-mentioned method finds the attitude of the sensor by solving an optimization problem finding the coordinate transformation matrix A that minimizes an objective function defined as the following Equation 2. Examples of the above-mentioned method include a DAVENPORT algorithm in which the solution is found by transforming an attitude determination problem into an eigenvalue problem using an attitude quaternion, a QUEST algorithm, and the like.

$$J(A) = \frac{1}{2}\sum_{i=1}^{N} |\hat{W}_i - A\hat{V}_i|^2 \qquad \text{[Equation 2]}$$

Here,

J(A) is an objective function,

A is the coordinate transformation matrix of the plane image sensor,

N is the number of targets in the imaged image, $\hat{W}_i$ is the position vector of the imaged image, and $\hat{V}_i$ is the direction vector in the inertia coordinate system of the target.

As described above, the method for determining the attitude of the plane image sensor needs to simultaneously measure a relative position vector and an image position vector for at least two or more targets, and in this case, a calculated result becomes the attitude of the sensor at the imaging timing and the above-mentioned scheme may be applied to only a case using the plane image sensor.

Methods for estimating an absolute misalignment between an attitude control system sensor and an image payload generally use a scheme in which the image payload is regarded as another attitude control sensor to estimate a relative misalignment between the attitude control system sensor and the image payload, and therefore, in a case in which the image payload uses the two-dimensional plane image sensor, the method for estimating the absolute misalignment of the above-mentioned scheme may be applied.

Figure 2:
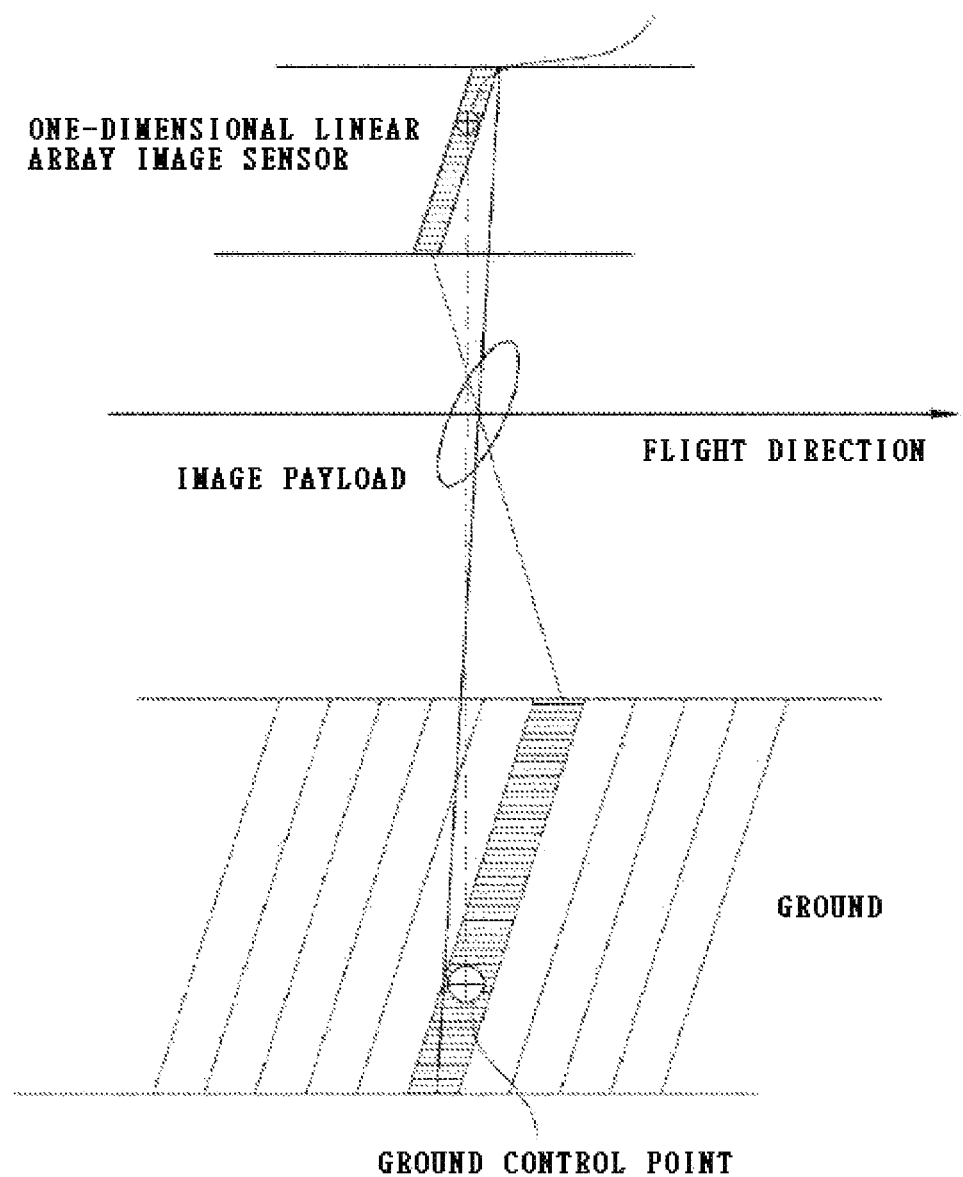
FIG. 2 is a diagram illustrating an example of a scheme in which an imaging satellite having high resolution scans a linear array sensor to obtain an image.

However, in a case of a ground imaging satellite imaging ground objects at high resolution, an image is imaged by a scheme performing a scan in a straight line using a linear array sensor as shown in FIG. 2, and therefore, according to the above-mentioned imaging scheme, the ground control points which are not on the same scan line are imaged at different timings. In this case, the attitude of the satellite is not fixed for the inertia coordinate system and is continuously changed.

Therefore, when the ground control points (GCP) are imaged by the above-mentioned scheme, since the attitude of the satellite is finely changed for every imaging moment, it is difficult to directly apply the attitude determination method applied to the plane image sensor to the linear array sensor.

Therefore, the present inventor has developed a method for calibrating an absolute misalignment of an attitude control sensor using the imaged image by the linear array sensor, and hereinafter, a detail description thereof will be provided.

Figure 3:
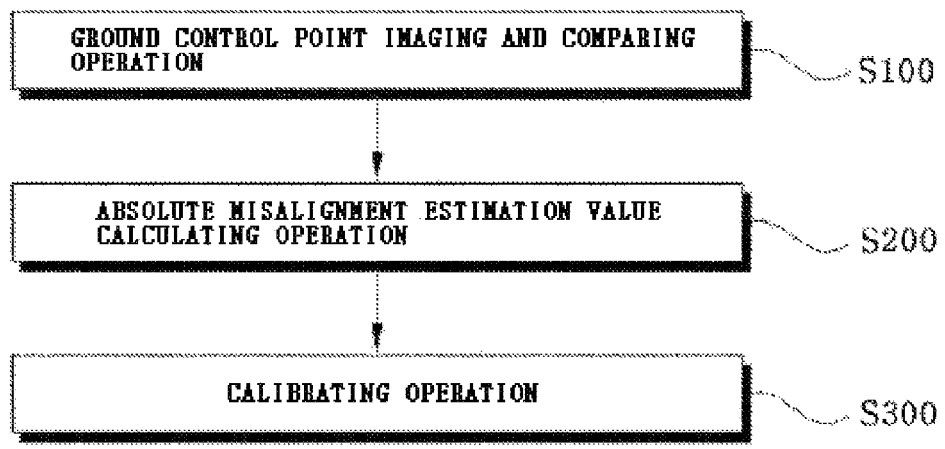
FIG. 3 is a flow chart sequentially illustrating a method for calibrating an absolute misalignment of an attitude control sensor according to the present invention.

The method for calibrating the absolute misalignment of the image sensor according to the present invention includes a ground control point imaging and comparing operation (S100), an absolute misalignment estimation value calculating operation (S200), and a calibrating operation (S300) as shown in FIG. 3.

(1) Ground Control Point Imaging and Comparing Operation (S100)

In this operation, after a plurality of ground control points of which accurate position information is known are each imaged using the image payload mounted in the satellite, the position information of the ground control points in a plurality of imaged images and the position information of the ground control points (hereinafter, referred to as "reference points") which are already known are compared with each other.

In a case in which N reference points are imaged using the image payload, a relationship between an image vector of a reference point at a moment imaging a i-th reference point and a relative position vector between the satellite and the reference point may be expressed by a coordinate transformation equation as in the following Equation 3.

$$\begin{bmatrix} X_i - X_i^S \\ Y_i - Y_i^S \\ Z_i - Z_i^S \end{bmatrix}_{ECI} = \frac{1}{\lambda} A_i \begin{bmatrix} x_i \\ y_i \\ z_i \end{bmatrix}_{Image} \qquad \text{[Equation 3]}$$

Here, $X_i^S, Y_i^S, Z_i^S$ is a position vector of an image satellite at the moment imaging the i-th reference point, $X_i, Y_i, Z_i$ is a position vector of the i-th reference point, $x_i, y_i, z_i$ is a position vector of the imaged reference point, $A_i$ is a coordinate transformation matrix showing an attitude of a payload coordinate system for an earth centered inertia (ECI) at the moment imaging the i-th reference point, and $\lambda$ is a scaling value for matching norm magnitudes of vectors which are present in left and right terms, respectively.

In this case, for values of the position vector $(x_i, y_i, z_i)$ in the reference point image, as being seen from FIG. 2, $z_i$ is equal to a focal distance f of an optical system of the payload, $X_i$ is 0, and only $y_i$ is changed depending on the reference point.

In the method for determining the attitude by the plane image sensor according to the related art, at least two or more reference points need to be imaged at the same time (simultaneously) in order to determine the coordinate transformation matrix $A_i$ showing an attitude of a payload (PL) coordinate system for the earth centered inertia (ECI) at the moment imaging the i-th reference point.

However, in the payload of the linear array sensor scheme, a case in which a plurality of reference points on the same scan line are simultaneously imaged is extremely rare, and even though there is a case in which the plurality of reference points are imaged, since accuracy of alignment information estimation is low due to the low number of reference points, it is required for a misalignment estimating technique of another scheme. For this reason, according to the present invention, Equation 3 is transformed into an earth centered earth fixed frame (ECEF), which generally results from a fact that the position vector of the satellite and the position vector of the reference point are expressed using the earth centered earth fixed frame (ECEF).

When the above-mentioned Equation 3 is expressed using the earth centered earth fixed frame (ECEF), it may be expressed as in the following Equation 4.

$$\begin{bmatrix} X_i - X_i^S \\ Y_i - Y_i^S \\ Z_i - Z_i^S \end{bmatrix}_{ECEF} = \frac{1}{\lambda} M_{ECI}^{ECEF} M_{Body}^{ECI} M_{PL}^{Body} \begin{bmatrix} x_i \\ y_i \\ z_i \end{bmatrix}_{Image} \qquad \text{[Equation 4]}$$

Here, $X_i, Y_i, Z_i$ is the position vector of the i-th reference point, $X_i^S, Y_i^S, Z_i^S$ is the position vector of the image satellite at the moment imaging the i-th reference point, λ is the scaling value, $M_{ECI}^{ECEF}$ is a coordinate transformation matrix from the earth centered inertia to the earth centered earth fixed frame, $M_{Body}^{ECI}$ is a coordinate transformation matrix from a body coordinate system of the satellite to the earth centered inertia, and $M_{PL}^{Body}$ is a coordinate transformation matrix from the payload coordinate system to the body coordinate system of the satellite.

In the above Equation 4, $M_{ECI}^{ECEF}$ is a function according to an imaging timing of the reference point, $M_{Body}^{ECI}$ is determined by the attitude of the satellite measured or estimated using the attitude control sensor at the moment imaging the reference point, and the scaling value λ becomes λ=1 in a case in which both the relative position vector and the image vector are divided by the respective norms to be normalized.

For the coordinate transformation matrix $M_{PL}^{Body}$ from the payload (PL) coordinate system to the body coordinate system, if a mounting attitude of the attitude control sensor of the satellite is measured for the payload (PL) coordinate system and the attitude of the satellite is calculated by applying mounting information, in an ideal case, that is, in a case in which no misalignment is present, the body coordinate system of the satellite and the payload (PL) coordinate system have a coordinate axis in the same direction, and consequently, $M_{PL}^{Body}=I_3$.

However, as described above, actually, error is present in alignment information due to measurement error, an effect of impact upon launching the satellite, or the like, and consequently, a process of estimating the absolute misalignment may be a process of finding the coordinate transformation matrix $M_{PL}^{Body}$ from the payload (PL) coordinate system to the body coordinate system of the satellite, or a value of an attitude quaternion q corresponding to $M_{PL}^{Body}$.

As described above, in the case in which the reference points are imaged using the linear array sensor, the coordinate transformation matrixes $M_{ECI}^{ECEF}$ and $M_{Body}^{ECI}$ as well as the relative position vector and the image vector have different values for every respective reference point.

In order to transform the above Equation 4 into a form of Equation 2 used in the attitude determination method according to the related art, when Equation 4 is divided and re-disposed into a time-varying term and a time-invariant term and a value of the position vector $(x_i, y_i, z_i)$ in the reference point image is substituted, the following Equation 5 may be expressed.

$$M_{Body}^{PL} M_{ECI}^{Body} M_{ECEF}^{ECI} \begin{bmatrix} X_i - X_i^S \\ Y_i - Y_i^S \\ Z_i - Z_i^S \end{bmatrix}_{ECEF} = \frac{1}{\lambda} \begin{bmatrix} 0 \\ y_i \\ f \end{bmatrix}_{Image}$$

[Equation 5]

In the above Equation 5, when it is considered that the coordinate transformation matrixes $M_{ECI}^{Body}$ and $M_{ECEF}^{ECI}$ each have different values according to the imaging timing of the reference point, the Equation 5 may be simplified as in the following Equation 6.

$$M_{Body}^{PL} \hat{V}_i = \hat{W}_i$$

[Equation 6]

$$\hat{V}_i = M_{ECI}^{Body} M_{ECEF}^{ECI} \begin{bmatrix} X_i - X_i^S \\ Y_i - Y_i^S \\ Z_i - Z_i^S \end{bmatrix}_{ECEF},$$

Wherein $$\hat{W}_i = \begin{bmatrix} 0 \\ y_i \\ f \end{bmatrix}_{Image},$$

and it is assumed that all vectors are normalized.

(2) Absolute Misalignment Estimation Value Calculating Operation (S200)

In this operation, the absolute misalignment between the attitude control sensor and the image payload is estimated using information obtained by performing the reference point imaging and comparing operation (S100) as described above.

In accordance with the above Equation 6, it may be seen that Equation 6 has the same form as Equation 1, and since the values of $\hat{V}_i$ and $\hat{W}_i$ are position measurement values of the satellite which may be measured using global positioning system (GPS) or the like, attitude measurement values measured by the attitude sensor, and values which may be found using an imaging time, a position in the imaged image, and the like, when the attitude determination method such as the DAVENPORT algorithm finding the solution by performing the transformation into the eigenvalue problem using the technique applied to the plane image sensor, that is, the attitude quaternion which is an optimization technique using Equation 1, QUEST algorithm finding the solution by applying a numerical analysis technique, or the like is applied to the images obtained by imaging the N reference points and the position information, the coordinate transformation matrix $M_{Body}^{PL}$ showing the absolute misalignment may be directly found. In this case, as there is a lot of image information and position information for the ground control points, mean square error is statistically decreased, and as a result, a more accurate absolute misalignment estimation value may be found.

Meanwhile, as described above, the method for determining the attitude of the satellite using the DAVENPORT algorithm and the QUEST algorithm is well-known, but the DAVENPORT algorithm will be schematically described below.

In a method for finding the coordinate transformation matrix A minimizing the above Equation 2, the attitude quaternion q corresponding to the coordinate transformation matrix A is found by the following process.

First, a matrix B is defined as in the following Equation 7.

$$B = \sum_{i=1}^{N} \hat{W}_i - \hat{V}_i^I$$

[Equation 7]

From the matrix B,

S=trB, S=B+B$^T$, $$Z = \begin{bmatrix} B_{23} - B_{32} \\ B_{23} - B_{32} \\ B_{23} - B_{32} \end{bmatrix}$$

are calculated.

Here, trB is a trace of the matrix B.

A Davenport matrix K is calculated using the above-mentioned values as in the following Equation 8.

$$K = \begin{bmatrix} S - sI & Z \\ Z^T & s \end{bmatrix}$$ [Equation 8]

Therefore, the attitude quaternion q corresponding to the coordinate transformation matrix A may be found by solving an eigenvalue equation as in the following Equation 9.

$$Kq = \lambda_{max} q$$ [Equation 9]

Here, $\lambda_{max}$ is a maximum eigenvalue of the Davenport matrix K and q is an eigenvector having the above-mentioned eigenvalue.

Since the method for finding the eigenvalue and the eigenvector is well-known, a detailed description thereof will be omitted.

(3) Calibrating Operation (S300)

In this operation, when the absolute misalignment estimating value is calculated by the absolute misalignment estimation value calculating operation (S200), the absolute misalignment is calibrated by applying the calculated absolute misalignment estimation value, that is, $M_{Body}^{PL}$ to the attitude control sensors.

New attitudes of the attitude control sensors are found by the following Equation 10, and when the attitude control is performed by transforming attitude information and angular velocity information measured by the attitude sensors to the body coordinate system of the satellite using the attitude of the sensor found by using Equation 10, the payload coordinate system is automatically controlled to be accurately matched to a control instruction attitude.

$$M_{Body}^{S}(\text{new}) = M_{Body}^{S}(\text{old})(M_{Body}^{PL})^I$$ [Equation 10]

Here, a superscript S shows the attitude control sensor.

The present inventor estimates the absolute misalignment between the satellite body and the image payload and then performs an experiment to which the estimated absolute misalignment is applied, in order to check validity of the present invention including the above-mentioned processes.

The experiment includes a process of most accurately measuring an alignment of an image sensor of the payload before launching the satellite and reflecting the measured alignment to alignment information of the attitude control sensor (body), a process of calculating an initial ground position accuracy calculated by using image information of the reference point imaged after an actual launch of the satellite and attitude information of the satellite, and a process of performing an estimation and calibration of the absolute misalignment two times using the above-mentioned information.

Figure 4:
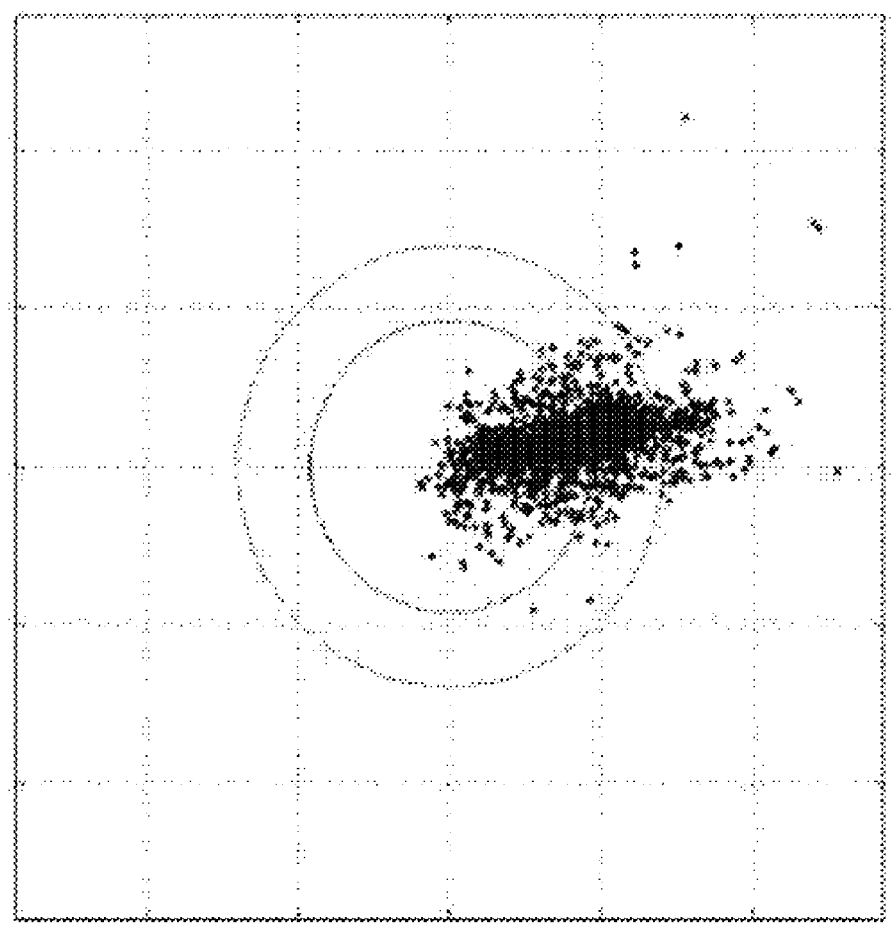
FIG. 4 is a graph illustrating position accuracy error after performing a primary calibration by the method for calibrating an absolute misalignment of an attitude control sensor according to the present invention.
Figure 5:
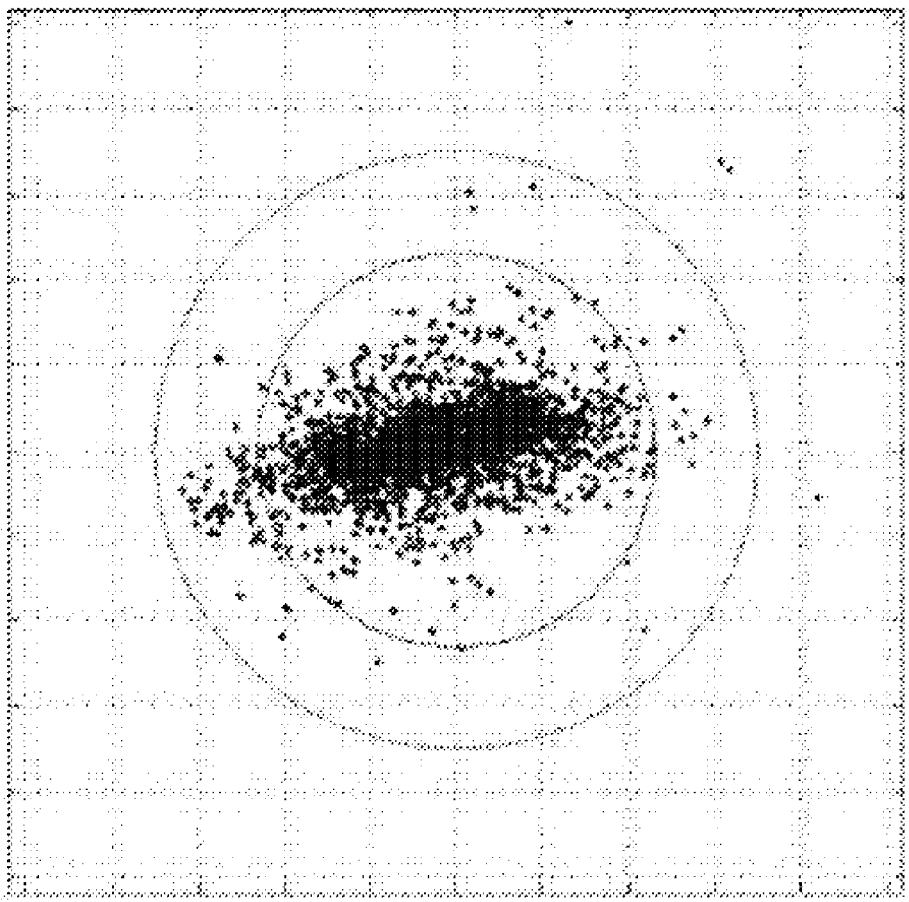
FIG. 5 is a graph illustrating position accuracy error after performing a secondary calibration by the method for calibrating an absolute misalignment of an attitude control sensor according to the present invention.

FIGS. 4 and 5 are graphs illustrating the experiment result. Referring to FIG. 4, as a result of estimating and calibrating a primary absolute misalignment, it may be appreciated that position accuracy error is significantly decreased to a level of about 5% as compared to an initial level. This means that a significant level of error occurs in the alignment information between the body, the sensor, and the payload measured before the launching of the satellite due to measurement error, impact upon the launching, or the like, and also means that the error is significantly and accurately estimated and calibrated by the method according to the present invention.

However, since deviation of a fine degree is still observed in the primary misalignment estimation result, the estimation and the calibration of the misalignment has been secondarily performed using the images of more reference points, and as a result, as shown in FIG. 5, it may be confirmed that a variation of the position accuracy is very successfully modified.

Although the method for calibrating the absolute misalignment based on the imaging satellite has been described, it will be apparent that the method for calibrating the absolute misalignment according to the present invention may also be applied to a flight vehicle such as an airplane, an airship, or the like.

As described above, according to the present invention, the absolute misalignment between the attitude control sensor and the image payload may be simply and accurately estimated and calibrated by applying the technique of determining the attitude of the sensor using the plane image information by the conventional plane image sensor to the attitude information measured by the attitude control sensor and the image information imaged by the image payload using the one-dimensional linear array image sensor.

The invention claimed is:

1. A method for estimating and calibrating an absolute misalignment of a satellite or a flight vehicle imaging ground images at high resolution and transmitting the imaged ground images to a ground, the method comprising:

a ground control point imaging and comparing operation in which a plurality of ground control points of which accurate position information is known are each imaged using an image payload using a linear array sensor and position information of the ground control points in a plurality of imaged images and position information of the ground control points which are already known are then compared with each other;

an absolute misalignment estimation value calculating operation of estimating an absolute misalignment value between an attitude control sensor and the image payload by applying a method for estimating the absolute misalignment using an image obtained by a plane image sensor to information obtained by performing the ground control point imaging and comparing operation;

a calibrating operation of calibrating the absolute misalignment by applying the calculated absolute misalignment estimation value to attitude control sensors; and wherein the information obtained by the ground control point imaging and comparing operation is transformed to have a form of the following Equation 6 by dividing and re-disposing the information into a time-varying term and a time-invariant term $$M_{Body}^{PL} \hat{V}_i = \hat{W}_i$$ [Equation 6]

$$\hat{V}_i = M_{ECI}^{Body} M_{ECEF}^{ECI} \begin{bmatrix} X_i - X_i^S \\ Y_i - Y_i^S \\ Z_i - Z_i^S \end{bmatrix}_{ECEF}$$

wherein $$\hat{W}_i = \begin{bmatrix} 0 \\ Y_i \\ f \end{bmatrix}_{Image}$$

and it is assumed that all vectors are normalized.

2. The method of claim 1, wherein a method for calculating an attitude of the plane image sensor using an image of a target obtained by the plane image sensor is any one of a DAVENPORT algorithm and a QUEST algorithm among methods for minimizing an objective function defined as the following Equation 2

$$J(A) = \frac{1}{2}\sum_{i=1}^{N} |\hat{W}_i - A\hat{V}_i|^2 \qquad \text{[Equation 2]}$$

wherein J(A) is an objective function, A is a coordinate transformation matrix of the plane image sensor, N is the number of targets in the imaged image, and $\hat{W}_i$ is a position vector of the imaged image, and $\hat{V}_i$ is a direction vector in an inertia coordinate system of the target.

3. The method of claim 1, wherein the absolute misalignment estimation value $M_{Body}^{PL}$ is calculated by the Equation 6 and new attitudes of the attitude control sensors are calculated by the following Equation 10

$$M_{Body}^{S}(\text{new}) = M_{Body}^{S}(\text{old})(M_{Body}^{PL})^T \qquad \text{[Equation 10]}$$

wherein a superscript S shows the attitude control sensor.

* * * * *